United States Patent
Samaras et al.

(10) Patent No.: US 12,031,018 B2
(45) Date of Patent: Jul. 9, 2024

(54) POLYOLEFIN ELASTOMER IN MULTI-PACKAGING CARRIER

(71) Applicant: Illinois Tool Works Inc., Glenview, IL (US)

(72) Inventors: Christopher J. Samaras, Tinley Park, IL (US); Rachell L. Slovik, Bartlett, IL (US); Patrick R. Van Tholen, Lombard, IL (US)

(73) Assignee: Illinois Tool Works Inc., Glenview, IL (US)

( * ) Notice: Subject to any disclaimer, the term of this patent is extended or adjusted under 35 U.S.C. 154(b) by 733 days.

(21) Appl. No.: 17/143,884

(22) Filed: Jan. 7, 2021

(65) Prior Publication Data
US 2021/0214537 A1    Jul. 15, 2021

Related U.S. Application Data

(63) Continuation-in-part of application No. 16/741,149, filed on Jan. 13, 2020.
(Continued)

(51) Int. Cl.
| | |
|---|---|
| *C08L 23/06* | (2006.01) |
| *B65D 71/50* | (2006.01) |
| *C08L 23/08* | (2006.01) |

(52) U.S. Cl.
CPC ............ *C08L 23/06* (2013.01); *B65D 71/504* (2013.01); *C08L 23/0853* (2013.01);
(Continued)

(58) Field of Classification Search
CPC .................. C08L 23/06; C08L 23/0853; C08L 2205/025; C08L 2205/035; C08L 2205/03;
(Continued)

(56) References Cited

U.S. PATENT DOCUMENTS

| | | |
|---|---|---|
| 5,552,198 A | 9/1996 | Hiltner |
| 2002/0011423 A1 | 1/2002 | Weaver |

(Continued)

FOREIGN PATENT DOCUMENTS

| | | |
|---|---|---|
| CN | 1249265 A | 4/2000 |
| CN | 1557684 A | 12/2004 |

(Continued)

OTHER PUBLICATIONS

Office Action dated Dec. 2, 2022, in corresponding India Patent Application 202217038682.

(Continued)

*Primary Examiner* — Ruiyun Zhang
(74) *Attorney, Agent, or Firm* — Maxwell J. Petersen; FisherBroyles, LLP

(57) ABSTRACT

A flexible carrier for carrying a plurality of containers, such as soft drink and other beverage containers, is formed from a polymer composition which provides the carrier with improved elastic recovery following installation of the containers, along with tensile strength and tear resistance. The polymer composition includes about 10% to about 95% by weight of a post-consumer recycled plastic that includes recycled branched low-density polyethylene and recycled linear low-density polyethylene polymers, zero to about 90% by weight of a branched low-density polyethylene polymer having a density of about 0.910 to about 0.950 grams/cm$^3$, and greater than zero to about 65% by weight of an elastomeric ethylene copolymer that includes about 60% by weight to less than 100% by weight ethylene and greater than zero to about 40% by weight of a vinyl acetate comonomer.

23 Claims, 1 Drawing Sheet

Related U.S. Application Data

(60) Provisional application No. 63/052,868, filed on Jul. 16, 2020.

(52) U.S. Cl.
CPC ..... *C08L 2205/025* (2013.01); *C08L 2205/03* (2013.01); *C08L 2205/035* (2013.01); *C08L 2207/066* (2013.01); *C08L 2207/20* (2013.01)

(58) Field of Classification Search
CPC ........... C08L 2207/066; C08L 2207/20; B65D 71/504
USPC .......................................................... 524/524
See application file for complete search history.

(56) References Cited

U.S. PATENT DOCUMENTS

| | | |
|---|---|---|
| 2004/0147679 A1 | 7/2004 | Weaver et al. |
| 2004/0192850 A1 | 9/2004 | Weaver et al. |
| 2012/0227361 A1 | 9/2012 | Bates |
| 2018/0016750 A1 | 1/2018 | Lauria et al. |
| 2019/0062017 A1 | 2/2019 | Singh |
| 2020/0079939 A1* | 3/2020 | Müller .................... C08L 23/12 |
| 2020/0223608 A1 | 7/2020 | Samaras et al. |

FOREIGN PATENT DOCUMENTS

| | | |
|---|---|---|
| CN | 102648135 A | 8/2012 |
| CN | 103221309 A | 7/2013 |
| CN | 106660645 A | 5/2017 |
| EP | 1440902 A1 | 7/2004 |
| EP | 1440902 A1 | 7/2004 |
| GB | 2475622 | 5/2011 |
| GB | 2485895 A | 5/2012 |
| GB | 2485895 A | 5/2012 |
| JP | 4615871 B2 | 1/2011 |
| WO | 20010043962 | 6/2001 |
| WO | 2011051472 A1 | 5/2011 |
| WO | 2013019834 A1 | 2/2013 |
| WO | 2019240899 | 12/2019 |
| WO | 2020049366 | 3/2020 |
| WO | 2020084353 | 4/2020 |
| WO | 2020229932 | 12/2020 |
| WO | 2021067534 | 4/2021 |
| WO | 2021074698 | 4/2021 |

OTHER PUBLICATIONS

European Patent Office, English language version of International Search Report for International Application PCT/US2021/012610, May 25, 2020.

European Patent Office, English language version of Written Opinion of ISA for International Application PCT/US2021/012610, May 25, 2021.

European Patent Office, English language version of International Search Report for International Application PCT/US2020/013489, May 12, 2020.

European Patent Office, English language version of Written Opinion of ISA for International Application PCT/US2020/013489, May 12, 2020.

* cited by examiner

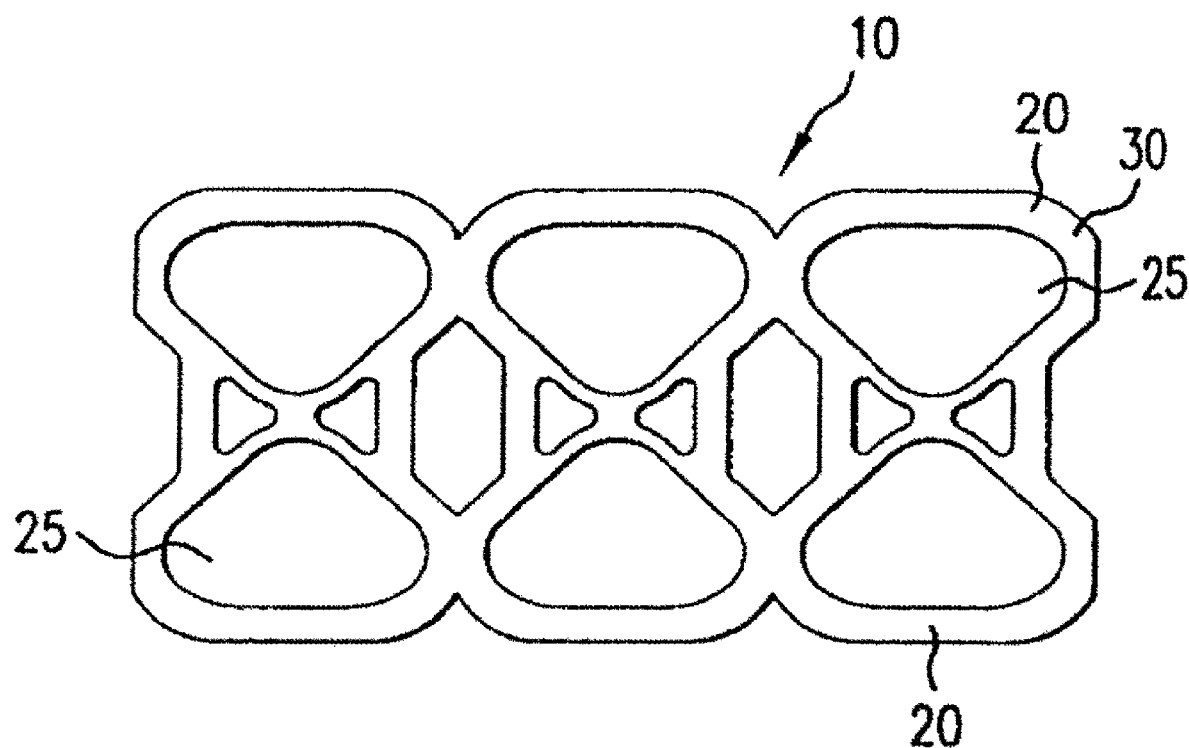

POLYOLEFIN ELASTOMER IN MULTI-PACKAGING CARRIER

RELATED APPLICATIONS

This application is a continuation-in-part of U.S. patent application Ser. No. 16/741,149, filed on Jan. 13, 2020. This application also claims priority to U.S. Provisional Application Ser. No. 63/052,868, filed on Jul. 16, 2020. Each of the foregoing applications is incorporated herein by reference.

FIELD OF THE INVENTION

This invention relates to a multi-packaging container carrier that includes a polyolefin elastomer for improving its elastic recovery.

BACKGROUND OF THE INVENTION

Conventional container carriers are often used to unitize a plurality of similarly sized containers, such as cans, bottles, jars and boxes and/or similar containers that require unitization. Flexible plastic ring carriers are one such conventional container carrier. Flexible plastic ring carriers having a plurality of container receiving apertures, typically of a generally oval, round or rectangular configuration, that each engage a corresponding container may be used to unitize groups of four, six, eight, twelve or other suitable groups of containers into a convenient multipackage.

Pending U.S. patent application Ser. No. 16/741,149, filed on Jan. 13, 2020 and published as U.S. 2002/0223608, describes a flexible container carrier formed using a polymer blend that includes a low density polyethylene, a post-consumer recycled plastic blend of low density polyethylene and linear low density polyethylene, and one or more additives for improving the manufacturing characteristics and/or post-consumer characteristics such as reduced degradation. Post-consumer recycled plastics ("PCRP's") are derived from end products, such as plastic containers, flexible container carriers, plastic bags and other plastic products that have completed their initial lifecycles as consumer products and can be recycled instead of being disposed of.

Although the increased use of PCRP's in multi-pack carriers is environmentally friendly, it has resulted in the loss of elastic recovery when the carriers are stretched to enable insertion of the containers into the apertures. Prolonged stretch of the carriers is detrimental to the manufacturing process because it slows down the container installation process and, in some cases, allows the containers to spontaneously dislodge after being installed. Maintaining a relatively short recovery time is vital for efficiently securing the containers in the carriers and restarting the installation process for the next subsequent carriers.

There is thus a need or desire for flexible plastic container carriers that enable the inclusion of significant quantities of PCRP's while maintaining standard, relatively short and efficient elastic recovery times during installation of the containers.

SUMMARY OF THE INVENTION

The present invention is directed to a flexible carrier for packaging containers that addresses the need for improved elastic recovery following installation of the containers into the apertures. The flexible container carrier includes a flexible sheet and a plurality of primary apertures formed in the sheet for receiving portions of the containers. The flexible sheet defines an arrangement of the container receiving apertures that are configured to permit placement over containers and permit carrying a unitized package of containers.

The flexible sheet is formed using a polymer composition that is designed to promote and optimize the use of post-consumer recycled plastics ("PRCP's") while providing enhanced elastic recovery of the sheet following insertion of containers into the apertures. The flexible sheet and container receiving apertures are designed to permit opening the apertures via generally even, distributed stretching of the container carrier in order to receive the containers. The flexible sheet may include generally oval, round, rectangular or triangular shaped container receiving apertures.

In one embodiment, the invention is directed to a flexible carrier for carrying a plurality of containers, including a flexible sheet and a plurality of primary apertures formed in the sheet for receiving portions of the containers. The flexible sheet is formed using a polymer composition which includes:

about 10% to about 95% by weight of a PCRP that includes recycled branched low-density polyethylene and recycled linear low-density polyethylene polymers;

zero to about 90% by weight of a branched low-density polyethylene polymer having a density of about 0.910 to about 0.950 grams/cm$^3$; and greater than zero to about 65% by weight of an elastomeric ethylene copolymer that includes about 60% by weight to less than 100% by weight ethylene and greater than zero to about 40% by weight of a vinyl acetate comonomer.

In another embodiment, the invention is directed to a flexible carrier for carrying a plurality of containers, including a flexible sheet and a plurality of primary apertures formed in the sheet for receiving portions of the containers. The flexible sheet is formed using a polymer composition which includes:

about 10% to about 95% by weight of a PCRP that includes recycled branched low-density polyethylene and recycled linear low-density polyethylene polymers;

about 5% to about 90% by weight of an ethylene-carbon monoxide copolymer which includes a branched low-density polyethylene polymer formed using a high-pressure polymerization process and a carbon monoxide comonomer; and greater than zero to about 65% by weight of an elastomeric ethylene copolymer that includes about 60% by weight to less than 100% by weight ethylene and greater than zero to about 40% by weight of a vinyl acetate comonomer.

In another embodiment, the invention is directed to a flexible carrier for carrying a plurality of containers, including a flexible sheet and a plurality of primary apertures formed in the sheet for receiving portions of the containers. The flexible sheet is formed using a polymer composition which includes:

about 40% to about 90% by weight of a PCRP that includes recycled branched low-density polyethylene and recycled linear low-density polyethylene polymers;

about 10% to about 60% of an elastomeric ethylene copolymer or blend thereof with a branched low-density polyethylene polymer, wherein the elastomeric ethylene copolymer or blend thereof has a combined vinyl acetate content of about 2% to about 10% by weight.

The polymer composition used to make the flexible sheet may also include additives such as slip agents and other processing aids for enhancing extrusion and/or die-cutting. Additives may include compounds for improving or aiding degradation including photodegradation and/or biodegradation, for example polyolefins including up to about 20% by weight of a carbon monoxide comonomer with or without an additional photodegradant or bioactive degradant.

With the foregoing in mind, it is a feature and advantage of the invention to provide a flexible container carrier that accommodates a high amount of PCRP and still provides excellent elastic recovery.

It is also a feature and advantage of the invention to provide a flexible container carrier that accommodates a high amount of PCRP without slowing down the process of securing the containers in the flexible carrier.

It is also a feature and advantage of the invention to provide a flexible container carrier that accommodates a high amount of PCRP while preventing distortion and dislodging of the containers due to slow elastic recovery.

The foregoing and other features and advantages of the invention will become further apparent from the following detailed description of the invention, read in conjunction with the accompanying drawings.

BRIEF DESCRIPTION OF THE DRAWING

FIG. 1 is a side elevational view of a container carrier according to one exemplary embodiment of this invention.

DETAILED DESCRIPTION OF THE INVENTION

FIG. 1 shows a flexible carrier 10 for unitizing multiple containers into a resulting unitized package. Although FIG. 1 illustrates a carrier having six container receiving apertures 25, the illustration is exemplary, and the invention is not limited to the flexible carrier shown for six containers. For example, the flexible carrier 10 may be alternatively configured and used to unitize four, eight, ten, twelve, or any other desired number of containers.

The containers can be cans or bottles, however any other commonly unitized containers may be used with flexible carrier 10 according to this invention. The containers are preferably, though not necessarily, like-sized within a single flexible carrier.

Each flexible carrier 10 can include a single layer of flexible sheet 20 having a width and length defining therein a plurality of container receiving apertures 25, each for receiving a container. The plurality of container receiving apertures can be arranged in two longitudinal rows and multiple longitudinal ranks to form an array of container receiving apertures, such as two rows by three ranks for a six container multipackage as shown in FIG. 1. Container receiving apertures 25 are preferably generally slightly elongated in a longitudinal direction of flexible carrier 10. The container receiving apertures 25 and intermediate (smaller) apertures are suitably formed in a geometry that results in a uniform application of the carrier to the containers A representative package resulting from flexible carrier includes a plurality of unitized containers. Flexible carriers 10 are generally applied to containers by stretching the portions of the flexible sheet surrounding the container receiving apertures around the containers and permitting the stretched carrier to recover to provide a tight engagement with the containers. Efficient elastic recovery of the stretched carrier is important in order to enable the resulting container assembly to be moved from the processing machine and stored, making way for the subsequent batch of containers to be installed in a flexible carrier.

The flexible carriers 10, such as shown in FIG. 1, are manufactured in a generally continuous string of carriers wherein the carriers are punched or otherwise formed longitudinally adjacent to other carriers. In this manner, a generally continuous string of carriers is formed that may be rolled onto reels or folded into boxes for later unwinding and application to containers. The carriers are then cut into individual carriers and packages. The containers to be inserted in the container receiving apertures 25 may have varying shapes and diameters. Referring to FIG. 1, for instance, each flexible carrier 10 is installed on containers by stretching the carrier receiving portions 30 in the cross direction, in opposing fashion. The subsequent recovery of the carrier receiving portions 30 provides the snug fit around the rib, chime or outside surface of the containers whose strength is impacted, in part, by the modulus and elastic recovery of the flexible sheet 20 used to construct the flexible carrier 10. The plan view dimensions of the flexible carrier 10, and its components, vary according to the end use. Particular end uses include without limitation soft drink and beverage cans and bottles of various sizes and shapes.

The flexible sheet 20 used to form the flexible container carrier 10 is desirably a plastic film, which can be formed by an extrusion process and then cut to form the flexible carrier. The flexible sheet 20 has a thickness which provides sufficient structural integrity to carry a desired number of containers. For instance, each flexible carrier 10 may be designed to carry multiple containers of a desired product having a specific weight, volume, shape and size. For most applications, the flexible sheet 20 may have a thickness of about 3-50 mils, suitably about 5-30 mils, commonly about 10-20 mils.

The flexible sheet 20 used to form the flexible carrier 10 is formed using a polymer composition that provides the carrier 10 with a desirable recovery after stretch, and suitable elongation and strength at break. Elongation at break and strength at break are measured using the stress-strain test described in ASTM D882-91, which procedure is incorporated by reference. Recovery after stretch can be measured using various standard and specialized procedures.

The polymer composition used to form the flexible carrier can include a PCRP that includes recycled branched low-density polyethylene and/or recycled linear low-density polyethylene polymers. The polymer composition can include about 10% to about 95% by weight of the PCRP, suitably about 25% to about 90% by weight of the PCRP, or about 40% to about 90% by weight of the PCRP, or about 40% to about 70% by weight of the PCRP.

The polymer composition used to form the flexible carrier can also include a branched low-density polyethylene polymer that has not been recycled. The polymer composition can include zero to about 90% by weight branched low-density polyethylene polymer, or about 5% to about 90% by weight of the branched low-density polyethylene polymer, suitably about 10% to about 75% by weight of the branched low-density polyethylene polymer, or about 10% to about 60% by weight, or about 30% to about 60% by weight. The branched low-density polyethylene polymer can have a density of about 0.910 to about 0.950 grams/cm$^3$, or about 0.915 to about 0.940 grams/cm$^3$, or about 0.920 to about 0.935 grams/cm$^3$.

The polymer composition used to form the flexible carrier can also include an elastomeric ethylene copolymer. The elastomeric ethylene copolymer improves the elastic recovery of the flexible container carrier 10 after it is stretched and the containers are installed in the apertures 25, enabling a more rapid and tighter fit between the flexible container carrier 10 and its containers. The polymer composition can include greater than zero to about 65% by weight of the elastomeric ethylene copolymer, or about 2% to about 50% by weight of the elastomeric ethylene copolymer, or about 2% to about 25% by weight, or about 2% to about 20% by weight, or about 3% to about 15% by weight, or about 3% to about 10% by weight.

The elastomeric ethylene copolymer can be ethylene-vinyl acetate and can include about 60% by weight to less than 100% by weight ethylene and greater than zero to about 40% by weight of a vinyl acetate comonomer. The elastomeric ethylene copolymer can include about 60% to about 98% by weight ethylene, or about 65% to about 97% by weight, or about 70% to about 96% by weight, or about 75% to about 95% by weight, or about 80% to about 95% by weight. In these embodiments, the elastomeric ethylene copolymer can include about 2% to about 40% by weight vinyl acetate, or about 3% to about 35% by weight, or about 4% to about 30% by weight, or about 5% to about 25% by weight, or about 5% to about 20% by weight. Suitable ethylene-vinyl acetate copolymers include without limitation those available from the Dow Chemical Co. under the name ELVAX®.

The recycled branched low-density polyethylene in the PCRP can be a high-pressure polyethylene homopolymer or ethylene-alpha olefin copolymer and is suitably a homopolymer. Its density may vary from about 0.910 to about 0.950 grams/cm$^3$, suitably about 0.920 to about 0.935 grams/cm$^3$. When the branched low-density polyethylene is a copolymer, its density will vary depending on the amount and type of ethylene-alpha olefin comonomer. The comonomer can be a $C_3$ to $C_{12}$ alpha-olefin, suitably a $C_4$ to $C_8$ alpha-olefin and can constitute from zero to 20% by weight, suitably zero to 10% by weight of the recycled branched low-density polyethylene polymer.

The recycled linear low-density polyethylene in the PCRP can be a low-pressure ethylene-alpha olefin copolymer having a density from about 0.910 to about 0.950 grams/cm$^3$, suitably about 0.920 to about 0.935 grams/cm$^3$. Its density will vary depending on the amount and type of ethylene-alpha olefin comonomer. The comonomer can be a $C_3$ to $C_{12}$ alpha-olefin, suitably a $C_4$ to $C_8$ alpha-olefin and can constitute from about 2 to 20% by weight, suitably about 3 to 10% by weight of the branched low-density polymer.

The PCRP can include any amount (zero to 100% by weight) of the recycled branched low-density polyethylene and any amount (zero to 100% by weight) of the recycled linear low-density polyethylene, and can suitably include about 10% to about 90% by weight of each, or about 25% to about 75% by weight of each, or about 40% to about 60% by weight of each.

The branched low-density polyethylene that has not been recycled can be a high-pressure polyethylene homopolymer, or an ethylene-alpha olefin copolymer, or a copolymer of any of the foregoing with carbon monoxide. The branched low-density polyethylene is suitably a polyethylene homopolymer or a copolymer of ethylene with carbon monoxide. When the branched low-density polyethylene is an ethylene-alpha olefin copolymer, its density will vary depending on the amount and type of ethylene-alpha olefin comonomer. The comonomer can be a $C_3$ to $C_{12}$ alpha-olefin, suitably a $C_4$ to $C_8$ alpha-olefin and can constitute from zero to 20% by weight, suitably zero to 10% by weight of the branched low-density polymer. When carbon monoxide is included either as an only comonomer or an additional comonomer in the branched low-density polyethylene, the carbon monoxide makes the carrier are prone to degradation in the presence of ultraviolet light. When carbon monoxide is included, it can be present at about 0.1 to 20% by weight of the branched low-density polymer, suitably about 1 to 10% by weight.

In order to ensure smooth processing, stretch and recovery, both the PCRP and the branched low-density polyethylene that has not been recycled should have a melt index of about 0.2 to 3.0 grams/10 min., suitably about 0.3 to 1.5 grams/10 min., or about 0.4 to 0.7 grams/10 min., measured at 190° C. using ASTM D1238. If either of the components does not have a met index within a desired range, then the combination of the PCRP and the branched low-density polyethylene together, and especially the overall polymer composition, should be tailored to have a melt index within the desired range.

The elastomeric ethylene copolymer can have a density of about 0.900 to about 0.940 grams/cm$^3$, suitably about 0.910 to about 0.930 grams/cm$^3$ or about 0.915 to about 0.925 grams/cm$^3$. The elastomeric ethylene copolymer can have a melt index of about 0.2 to about 20 grams/10 min., suitably about 0.2 to 3.0 grams/10 min., or about 0.3 to 1.5 grams/10 min., or about 0.4 to 0.7 grams/10 min., measured at 190° C. using ASTM D1238.

The amounts of elastomeric ethylene copolymer and branched low density polyethylene that has not been recycled can be varied to achieve a vinyl acetate content of about 2% to about 12% by weight, or about 3% and about 10% by weight, or about 4% to about 8% by weight, based on the combination of these two ingredients. For example, the higher the vinyl acetate content of the elastomeric ethylene copolymer, the less of the copolymer is required to achieve this level of vinyl acetate in the combination. In one embodiment, the branched low-density polyethylene can be omitted in favor of using an elastomeric ethylene copolymer that, in itself, has a vinyl acetate content of about 2% to about 12% by weight, or about 3% to about 10% by weight, or about 4% to about 8% by weight. Commercially available blends of elastomeric ethylene copolymer with branched low-density polyethylene can also be used, provided that the blend has an overall vinyl acetate content within the desired range. In one example, the polymer composition can include about 40% to about 90% by weight of a PCRP that includes recycled branched low-density polyethylene and recycled linear low-density polyethylene polymers, and about 10% to about 60% of an elastomeric ethylene copolymer or blend thereof with a branched low-density polyethylene polymer, wherein the elastomeric ethylene copolymer or blend thereof has a combined vinyl acetate content of about 2% to about 12% by weight, or about 3% to about 10% by weight, or about 4% to about 8% by weight.

In an alternative embodiment, the elastomeric ethylene copolymer can be an ethylene-vinyl acetate-carbon monoxide terpolymer. The terpolymer can include about 60% to about 98% by weight ethylene, or about 60% to about 90% by weight, or about 60% to about 80% by weight. The terpolymer can include about 1% to about 20% by weight vinyl acetate, or about 5% to about 20% by weight, or about 10% to about 20% by weight. The terpolymer can include about 1% to about 20% by weight carbon monoxide, or about 5% to about 20% by weight, or about 10% to about 20% by weight. The presence of the carbon monoxide comonomer further aids biodegradability (especially photodegradability) of the flexible carrier 10 in the presence of sunlight.

The polymer composition can include additional quantities of known and/or identifiable additives. For instance, it can be appreciated that commercially available PCRP blends that are based primarily on recycled branched low-density polyethylene and recycled linear low-density polyethylene can also include minor amounts (generally less than 10% by weight, suitably less than 5% by weight) of other plastic materials. The following Table 1 represents a component analysis of three batches of one suitable PCRP blend that is based on recycled branched low-density polyethylene and recycled linear low-density polyethylene. While the hexene and butene are common comonomers contained in linear low-density polyethylene, the propylene and styrene are usually present in separate polymers.

TABLE 1

Component Analysis of One PCRP

| Sample # | wt % PP (as propylene) | wt % Butene | wt % Hexene (includes some LDPE) | Approximate wt % LDPE | wt % Styrene | Approximate wt % LLDPE |
|---|---|---|---|---|---|---|
| 1 | 1.8 | 2.2 | 4.4 | 50 | 0.05 | 45 |
| 2 | 2.3 | 2.0 | 4.4 | 45 | 0.15 | 45 |
| 3 | 1.7 | 2.6 | 3.8 | 53 | 0.29 | 38 |

The polymer composition can also contain other optional additives at about 0.1 to about 10% by weight of the composition to be used as processing aids to improve or optimize elastic recovery of the carrier and/or pro-degradants to enhance the biodegradability of the carrier. Suitable pro-degradants include photodegradants and bioreactive degradants which can be present at 0.1-10 percent by weight, or 0.1-5% by weight of the composition when used. Examples include without limitation ColorTech® 10365-16 available from Colortech, Inc. in Morristown, Tennessee and Symphony® D2w available from Symphony Environmental Technologies in the United Kingdom. In one embodiment, a single-site catalyzed ethylene-alpha olefin copolymer plastomer may be included, suitably at about 1 to about 10% by weight of the polymer composition, to enhance recovery and modulus characteristics of the flexible carrier 10. The plastomer may have a density of about 0.850-0.905 grams/cm$^3$. Examples of suitable single-site catalyzed ethylene-alpha olefin copolymer plastomers are available from Exxon-Mobil Chemical Co. under the trade name EXACT, and from Dow Chemical Co. under the trade names AFFINITY and ENGAGE.

Other additives that may constitute 0.1-10% of the polymer composition include slip agents and other processing aids for enhancing extrusion and/or die-cutting. Other additives may include an antiblock, antioxidant, and slip to adjust the composition to accommodate the stretch and recovery characteristics required in the finished container carrier.

EXAMPLES

The following materials were used in these Examples:
PCRP blend—as described in Table 1 above.
Branched LDPE—Dow 4581 (proprietary ethylene-carbon monoxide copolymer).
Ethylene Vinyl Acetate—Lyondell-Basell LB362 (commercial blend of branched LDPE and EVA containing 6.6% overall EVA).
Processing Aid—KYNAR FLEX 5300.
Other Additives: Slip, antioxidant, antiblock.

A polymer composition containing 55% by weight PCRP, 44% by weight Dow 4581 branched low-density polyethylene, 0.25% by weight processing aid and 0.75% by weight other additives was used to form a flexible container carrier. A similar flexible container carrier was formed using a conventional polymer composition without the PCRP and including 99% by weight of the Dow 4581 with the processing aid and other additives. In order to compare the elastic recovery of the two materials, both polymer compositions were evaluated for elastic recovery and modulus according to ASTM D882-91. The recovery time for the polymer composition containing the PCRP was found to be three to four times greater than the recovery time for the conventional polymer composition. Such a significant difference will slow down the time required to install containers in the carrier that utilizes the PCRP.

Next, the foregoing polymer composition containing the PCRP was modified by replacing the conventional branched LDPE with Lyondell Basell LB362, which contains 6.6% by weight overall vinyl acetate as described above. The resulting modified polymer composition was formed into a container carrier. The modified polymer composition was evaluated for elastic recovery and modulus according to ASTM D882-91. The modified polymer composition was found to have an elastic recovery time only 10-15% greater than the elastic recovery of the conventional polymer composition without the PCRP, rendering it suitable for use for container carriers.

The results of these evaluations are shown in Table 2 below.

TABLE 2

Elastic Modulus and Recovery

| Polymer Composition | Elastic Modulus | Elastic Recovery |
|---|---|---|
| LDPE + Additives | 18,000 ± 2000 psi | <2 seconds |
| PRCP + LDPE + Additives | 18,000 ± 2000 psi | 8 seconds |
| PCRP + LDPE/EVA blend + Additives | 14,500 psi | 2 seconds |

While in the foregoing specification this invention has been described in relation to certain preferred embodiments thereof, and many details have been set forth for purpose of illustration, it will be apparent to those skilled in the art that flexible carrier 10 is susceptible to additional embodiments and that certain of the details described herein can be varied considerably without departing from the basic principles of the invention.

The invention claimed is:

1. A flexible carrier for carrying a plurality of containers, comprising a flexible sheet and a plurality of primary apertures formed in the sheet for receiving portions of the containers, the flexible sheet comprising a polymer composition which includes:
    about 10% to about 95% by weight of a PCRP that includes recycled branched low-density polyethylene and recycled linear low-density polyethylene polymers;
    zero to about 90% by weight of a branched low-density polyethylene polymer that has not been recycled, having a density of about 0.910 to about 0.950 grams/cm$^3$ and including a carbon monoxide comonomer; and greater than zero to about 65% by weight of an elastomeric ethylene copolymer that includes about 70% to about 96% by weight ethylene and about 4% to about 30% by weight of a vinyl acetate comonomer.

2. The flexible carrier of claim 1, wherein the recycled branched low-density polyethylene and the recycled linear low-density polyethylene polymers each have a density of about 0.910 to about 0.950 grams/cm³.

3. The flexible carrier of claim 1, wherein the branched low-density polyethylene is present at about 5% to about 90% by weight of the polymer composition and comprises an ethylene homopolymer.

4. The flexible carrier of claim 1, wherein the branched low-density polyethylene is present at about 5% to about 90% by weight of the polymer composition and comprises an ethylene-alpha olefin copolymer.

5. The flexible carrier of claim 1, wherein the elastomeric ethylene copolymer includes about 80% to about 95% by weight ethylene and about 5% to about 20% by weight of the vinyl acetate comonomer.

6. The flexible carrier of claim 1, wherein the PCRP is present at about 40% to about 90% by weight of the polymer composition.

7. The flexible carrier of claim 6, wherein the branched low-density polyethylene polymer is present at about 10% to about 60% by weight of the polymer composition.

8. The flexible carrier of claim 1, wherein the elastomeric ethylene copolymer is present at about 3% to about 10% by weight of the polymer composition.

9. A flexible carrier for carrying a plurality of containers, comprising a flexible sheet and a plurality of primary apertures formed in the sheet for receiving portions of the containers, the flexible sheet comprising a polymer composition which includes:
about 10% to about 95% by weight of a PCRP that includes recycled branched low-density polyethylene and recycled linear low-density polyethylene polymers;
zero to about 90% by weight of a branched low-density polyethylene polymer that has not been recycled, having a density of about 0.910 to about 0.950 grams/cm³; and
greater than zero to about 65% by weight of an elastomeric ethylene copolymer that includes about 60% by weight to less than 100% by weight ethylene and greater than zero to about 40% by weight of a vinyl acetate comonomer;
wherein the elastomeric ethylene copolymer includes an ethylene-vinyl acetate-carbon monoxide terpolymer.

10. The flexible carrier of claim 9, wherein the ethylene-vinyl acetate-carbon monoxide terpolymer includes about 60% to about 90% by weight ethylene, about 5% to about 20% by weight vinyl acetate, and about 5% to about 20% by weight carbon monoxide.

11. The flexible carrier of claim 9, wherein the elastomeric ethylene copolymer is present at about 2% to about 20% by weight of the polymer composition.

12. The flexible carrier of claim 9, wherein the branched low-density polyethylene polymer further comprises a carbon monoxide comonomer.

13. The flexible carrier of claim 12, wherein the elastomeric ethylene copolymer includes about 70% to about 96% by weight of the ethylene and about 4% to about 30% by weight of the vinyl acetate comonomer.

14. The flexible carrier of claim 12, wherein the PCRP is present at about 40% to about 90% by weight of the polymer composition.

15. The flexible carrier of claim 14, wherein the ethylene-carbon monoxide copolymer is present at about 10% to about 60% by weight of the polymer composition.

16. The flexible carrier of claim 9, wherein the polymer composition further comprises about 0.1 to about 10% by weight of a prodegradant.

17. The flexible carrier of claim 16, wherein the prodegradant comprises a bioreactive degradant.

18. A flexible carrier for carrying a plurality of containers, comprising a flexible sheet and a plurality of primary apertures formed in the sheet for receiving portions of the containers, the flexible sheet comprising a polymer composition which includes:
about 10% to about 95% by weight of a PCRP that includes recycled branched low-density polyethylene and recycled linear low-density polyethylene polymers;
zero to about 90% by weight of a branched low-density polyethylene polymer that has not been recycled, having a density of about 0.910 to about 0.950 grams/cm³; and
greater than zero to about 65% by weight of an elastomeric ethylene copolymer that includes about 60% by weight to less than 100% by weight ethylene and greater than zero to about 40% by weight of a vinyl acetate comonomer;
wherein the polymer composition further comprises about 0.1 to about 10% by weight of a prodegradant.

19. The flexible carrier of claim 18, wherein the prodegradant comprises a bioreactive degradant.

20. The flexible carrier of claim 18, wherein
the elastomeric ethylene copolymer includes an ethylene-vinyl acetate-carbon monoxide terpolymer.

21. The flexible carrier of claim 20, wherein the ethylene-vinyl acetate-carbon monoxide terpolymer includes about 60% to about 90% by weight ethylene, about 5% to about 20% by weight vinyl acetate, and about 5% to about 20% by weight carbon monoxide.

22. The flexible carrier of claim 18, wherein the elastomeric ethylene copolymer is present at about 3% to about 15% by weight of the polymer composition.

23. A flexible carrier for carrying a plurality of containers, comprising a flexible sheet and a plurality of primary apertures formed in the sheet for receiving portions of the containers, the flexible sheet comprising a polymer composition which includes:
about 40% to about 90% by weight of a PCRP that includes recycled branched low-density polyethylene and recycled linear low-density polyethylene polymers;
about 10% to about 60% of an elastomeric ethylene copolymer of ethylene and vinyl acetate or blend thereof with a branched low-density polyethylene polymer including a carbon monoxide comonomer, wherein the elastomeric ethylene copolymer or blend thereof has a combined vinyl acetate content of about 2% to about 12% by weight.

* * * * *